United States Patent [19]

Berger

[11] Patent Number: 4,778,204
[45] Date of Patent: Oct. 18, 1988

[54] PIPELINE CONNECTOR FOR PLASTIC INSTRUMENTS

[76] Inventor: Benjamin Berger, 151 Derech Hayam, Haifa, Israel

[21] Appl. No.: 904,876

[22] Filed: Sep. 8, 1986

[30] Foreign Application Priority Data

Sep. 8, 1985 [IL] Israel .................................... 76324

[51] Int. Cl.⁴ ............................................ F16L 17/04
[52] U.S. Cl. .................................. 285/353; 285/387; 285/921
[58] Field of Search ............... 285/353, 349, 386, 387, 285/175, 30, 423, 921

[56] References Cited

U.S. PATENT DOCUMENTS

| | | | |
|---|---|---|---|
| 190,651 | 5/1877 | Webster | 285/175 X |
| 269,626 | 12/1882 | Budel et al. | 285/384 |
| 290,446 | 12/1883 | McConnell | 285/175 X |
| 3,689,110 | 9/1972 | Ferguson | 285/387 X |
| 3,924,358 | 12/1975 | Elkhardt | 285/349 X |
| 3,931,992 | 1/1976 | Coel | 285/30 |
| 4,135,742 | 1/1979 | Anderson | 285/353 X |

FOREIGN PATENT DOCUMENTS

| | | | |
|---|---|---|---|
| 674429 | 4/1939 | Fed. Rep. of Germany | 285/353 |
| 884153 | 8/1943 | France | 285/353 |

Primary Examiner—Dave W. Arola
Attorney, Agent, or Firm—Abelman Frayne Rezac & Schwab

[57] ABSTRACT

A coupling device between the bottom end of a plastic instrument and a nipple comprising:

an exteriorly threaded ring element rotatably mounted about said bottom end;

a nut element mounted for rotation about said nipple and said ring element; and two O-rings, one sealingly mounted between the nut element, the ring element and the bottom end, and the second sealingly mounted between the nut element and the nipple;

wherein a gap is provided between the nipple and the bottom end.

4 Claims, 2 Drawing Sheets

PIPELINE CONNECTOR FOR PLASTIC INSTRUMENTS

FIELD OF THE INVENTION

The present invention relates to devices for coupling various instruments to pipes in general and, in particular, to couplings for plastic instruments in pipelines.

BACKGROUND OF THE INVENTION

Transportation of liquids and other fluids through pipes has long been known. It is often necessary to insert a flow meter, valve or other instrument at various places along the pipeline. The couplings at these joints must be strong enough to withstand the forces exerted on the pipes and must include sealing means to prevent leakage of the fluids from the pipe. Furthermore, due to the lengths and weights of the pipes involved, it is desirable to provide couplings which permit simple insertion and removal of the instruments in the fluid flow path, without moving the pipes.

Until recently, most of the pipes used for fluid flow, and particularly for water flow, were rigid metal pipes. The conventional manner of joining a metal instrument to metal pipes is by use of a union coupling including three elements: the thread end (i.e., the outlet of the instrument to be joined which is threaded with external threads), the bottom end (a nipple member adapted to be affixed to the end of the pipe to be joined, the nipple being fitted with interior threads and a small exterior shoulder) and a nut having an inside flange at one end and an inside thread like that on the exterior of the thread end at the other end. Generally a gasket or flat seal is placed between the thread and bottom ends, which are drawn together by the nut.

The advantage of these couplings is that instruments can be inserted into the pipeline without the need to translate or rotate the existing pipeline during attachment. Nonetheless, tension is often created on the instrument inserted into the pipeline due to imprecision of the fit between adjacent elements. That is, if the sections of pipe are a little too far apart or a little too close together for the ideal fit of the instrument therebetween, pressure and tension are created on the instrument.

In addition, torque stress is often generated through the tightening of the union on the elements. And finally, differences in ambient temperature cause piping to expand and contract, and the instrument suffers from the change in tension. As a particular example, when water meters are inserted into a pipeline, the pressure on the body of the water meter due to the method of coupling can be much greater than that which the meter must withstand during operation.

With conventional metal water meters and other metal instruments, these problems are essentially negligible, since the metal is stong enough to withstand these additional forces. However, with the advent of plastic instruments, the problem of couplings is more serious. The additional tension on these instruments frequently causes the instruments to break or malfunction.

SUMMARY OF THE INVENTION

It is therefore an object of the present invention to provide a simple coupling for plastic instruments or other devices, such as flow meters, hydraulic valves and the like, in a pipeline which overcomes the abovementioned disadvantages of the prior art.

There is thus provided in accordance with the present invention a coupling device between the bottom end of a plastic instrument (which term is used herein to refer to either the inlet or outlet of the instrument) and a nipple, wherein the bottom end does not define exterior threads but defines an outwardly extending flange and including two exteriorly threaded shell halves rotatably mounted about the bottom end of the instrument adjacent the flange, a nut element rotatably mounted about the nipple and the shell halves, and two O-rings, one sealingly mounted between the nut element, the shell halves and the bottom end, and the second sealingly mounted between the nut element and the nipple, wherein a gap is provided between the nipple and the bottom end.

There is further provided in accordance with the present invention a coupling in a pipeline for a plastic instrument including an outwardly extending flange on the edge of the bottom end of the instrument, two annular shell halves coupled about the bottom end abutting the flange, the shell halves having screw threads on their exterior surface and defining an outwardly extending flange at one end thereof, a nipple defining an exterior shoulder, a nut element mounted about the shell halves, the bottom end flange and the nipple and defining at the interior of one end thereof threads complementary to the threads on the exterior surface of the shell halves and defining an interior shoulder at the other end thereof, and two O-rings, one disposed about the bottom end engaging the body of the bottom end and the interior of the nut element, the second being sealingly disposed between the body of the nut element and the body of the nipple.

According to a preferred embodiment of the present invention, the second side of the instrument includes a coupling of a second nipple to the second bottom end by a union nut, characterized in that the bottom end is not threaded, two exteriorly threaded annular shell halves are provided non-rotatably coupled about the bottom end, and the union nut is arranged to engage the threads of the shell halves.

BRIEF DESCRIPTION OF THE DRAWINGS

The apparatus of the present invention will be further understood and appreciated from the following detailed description taken in conjunction with the drawings in which.

DETAILED DESCRIPTION OF THE INVENTION

Figure 1:
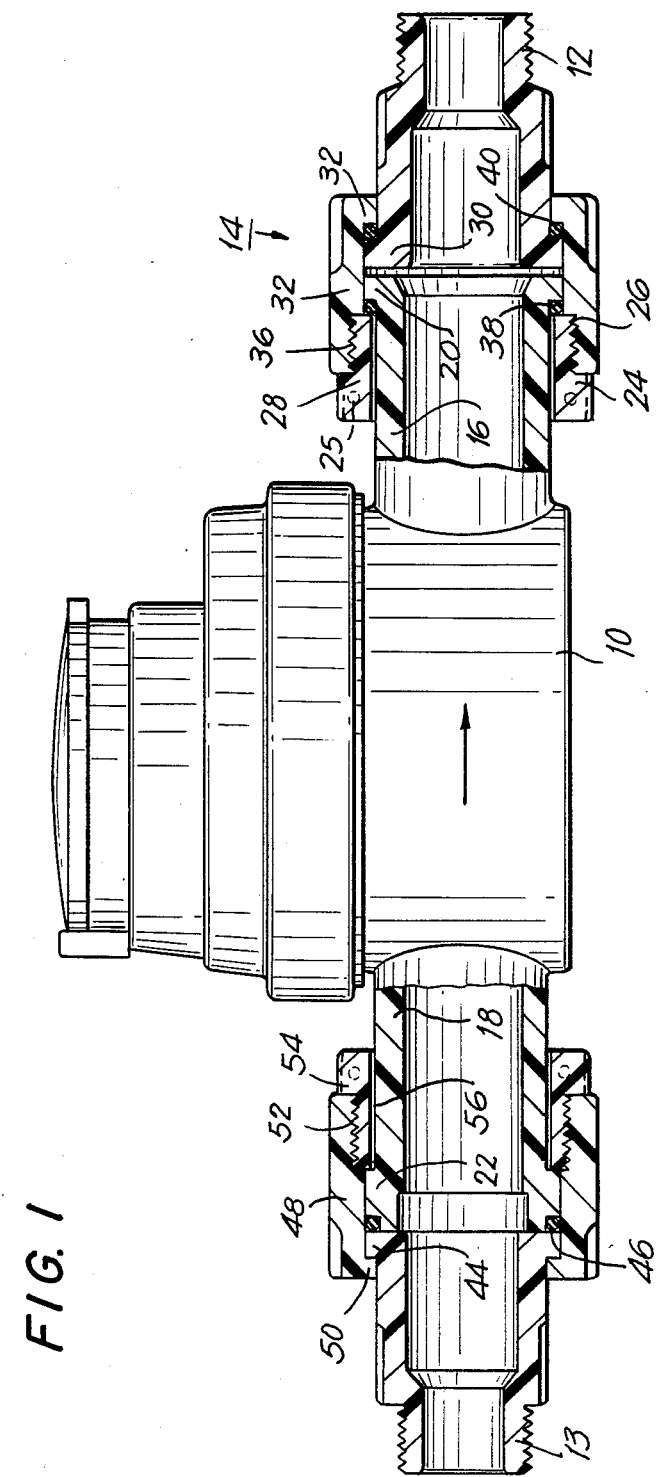
FIG. 1 is a sectional view of a coupling device constructed and operative in accordance with the present invention coupling a water meter to a pipeline.
Figure 2:
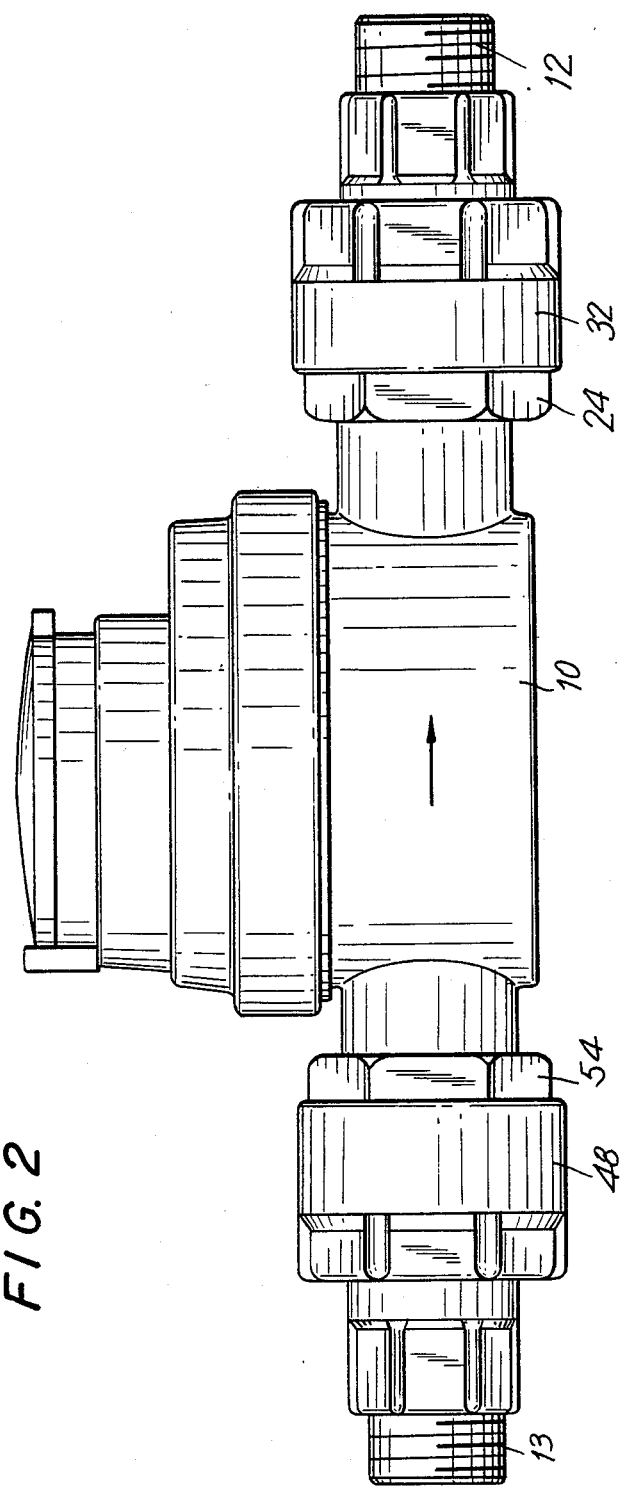
FIG. 2 is a plan view of the device of FIG. 1.

Referring now to FIGS. 1 and 2 there is shown in respective sectional and plan views a plastic instrument 10 coupled between nipple members 12, 13 (which, in turn, are adapted to be coupled in a pipeline) by means of a coupling device generally designated 14 constructed and operative in accordance with an embodiment of the present invention. Instrument 10 defines bottom ends 16 and 18 extending on either side thereof which serve as the outlet and inlet of the instrument. Each of bottom ends 16 and 18 defines an outwardly protruding flange 20, 22.

Rotatably mounted about bottom end 16 is a ring element 24 comprising two annular shell halves bolted to one another as by snap-fits 25. Ring element 24 defines screw threads 26 along the outer surface of its body and defines a protruding flange 28. Flange 28 preferably defines a hexagonal periphery permitting gripping thereof by known wrenches and the like. This can be seen most clearly in FIG. 2.

The nipple 12 to which instrument 10 is to be coupled defines an exterior shoulder 30. Rotatably mounted about nipple 12, flange 20 of bottom end 16 and ring element 24 is a nut member 32. Nut member 32 defines an interior shoulder 34 at one end thereof and screw threads 36 on the interior of its body at the other end thereof. Screw threads 36 on the interior of nut member 32 are complementary to threads 26 on the exterior of ring member 24.

Two O-rings 38 and 40 are utilized for sealing the coupling. O-ring 38 is disposed between the body of nut member 32 and the body of bottom end 16, between flange 20 and ring element 24, to prevent leakage through the bottom end. And O-ring 40 is disposed between the body of nut member 32 and the body of nipple 12, adjacent interior shoulder 34 and exterior shoulder 30, to prevent leakage through the nipple.

Operation of the coupling of the present invention is as follows. The instrument 10 is inserted in the appropriate location in the pipeline and is coupled at bottom end 18 to nipple 13 by any conventional union, or by means which will be further described hereinbelow. Bottom end 16 is then aligned adjacent nipple 12 and nut member 32 is screwed into tight engagement with ring element 24. As can be seen, there is no contact between flange 20 of bottom end 16 and shoulder 30 of nipple 12, as is required in conventional couplings. Rather, a gap remains between the two, preferably about 1 to 2 mm, although any other distance may be provided, depending upon the size of the O-rings and the length of the nut member.

It is a particular feature of the present invention that threads are not provided as an integral part of the exterior of the instrument body, i.e., on the inlet or outlet, but rather on a separate, replaceable element, ring element 24. Thus, the instrument is firmly tigntened into the pipeline at bottom end 18 by means of a union which insures the proper orientation of the instrument while leaving bottom end 16 free. The nut element of coupling 14 is tightened about ring element 24, which is freely rotatable relative to the instrument although restrained thereon by the flange on the bottom end. This ring element, thus, eliminates any torque stress on the instrument at the time of assembly in the pipeline.

It is a further particular feature of the present invention that upon rotation of nut member 32, O-rings 38 and 40 provide sealing between the bodies of the nut member and the nipple 12 and the bottom end 16. Thus, increased tension or other axial stress caused by expansion or contraction of the pipes or due to imprecision in the gap in the pipeline wherein the instrument 10 is inserted is initially absorbed by the O-rings and not transmitted to the instrument. Only after the O-rings have been completely compressed and the gap between the nipple and the bottom end has closed are the axial forces transmitted to the instrument, and then they are transmitted to the flange of the instrument only.

According to a preferred embodiment of the invention, bottom end 18 of instrument 10 is coupled to nipple 13 by a modified union coupling. Nipple 13 defines an exterior shoulder 44. A conventional gasket 46 or other flat seal is provided between flange 22 of bottom end 18 and shoulder 44 of nipple 13, and the bottom end and nipple are tightened into sealing engagement with one another by means of a conventional union nut 48. Union nut 48 defines an interior shoulder 50 at one end thereof complementary to exterior shoulder 44 of nipple 13, and at the other end defines a threaded portion 52.

The improvement in this embodiment comprises providing an outward flange on the end of bottom end 18, and no threads thereon. A ring element 54, identical to ring element 24 described with reference to FIG. 1 and defining screw threads 56 on part of its outer surface, is mounted about bottom end and is arranged so as not to rotate relative thereto. Any conventional means such as a protruding ridge (not shown) may be provided on bottom end 18 to engage a complementary groove or other means on ring element 54 and prevent rotation thereof. The threaded portion 52 of nut member 48 is complementary to threaded portion 56 of ring element 54 and is arranged for engagement therewith upon rotation of the nut member.

It is a particular feature of this embodiment of the invention that a strong, tight joint is provided while torque stress during tightening of the coupling and bringing the nipple 13 into engagement with bottom end 18 is largely absorbed by the ring element and not transferred to instrument 10. It is a further particular feature that the parts which are manufactured for the coupling device 14 of the present invention can also be utilized in the modified union coupling of bottom end 18 of the instrument.

The coupling device of the present invention can be formed of any suitable material, including metal. Preferably, the nut element and shell halves of the ring element are formed of a plastics material.

It will be appreciated that the apparatus of the present invention is not limited to what has been shown and described hereinabove by way of example. Rather, the scope of the invention is limited solely by the claims which follow.

I claim:

1. A coupling device between the bottom end of a plastic instrument and a nipple comprising:
   a ring element rotatably mounted about said bottom end comprising two exteriorly threaded shell halves affixed to one another about said bottom end and freely rotatable thereabout both during coupling and when uncoupled;
   a nut element mounted for rotation about said nipple, said bottom end and said ring element; and
   two O-rings, each having a radial compression set, one mounted for sealing engagement and radial compression between the nut element and the bottom end, and the other mounted for sealing engagement between the nut element and the nipple;
   wherein a gap is provided between the nipple and the bottom end.

2. A coupling as claimed in claim 1 and wherein the second bottom end of the instrument is coupled to a second nipple by a union nut coupling, wherein the improvement comprises:
   said second bottom end defining a flange at the end thereof and not defining screw threads on its exterior surface; and
   two exteriorly threaded annular shell halves coupled to one another for non-rotation about said second bottom end and abutting said flange; and a union nut mounted about said shell halves and said nipple and arranged to engage the threads of said shell halves.

3. A coupling in a pipeline for a plastic instrument including a bottom element to a nipple defining an exterior shoulder, said coupling comprising:
   an outwardly extending flange on the end of said bottom end;
   two annular shell halves coupled to one another about said bottom end and, freely rotatable thereabout both during coupling and when uncoupled, said shell halves having screw threads on their exterior surfaces and defining an outwardly extending flange at one end thereof;
   a nut element mounted about the shell halves, the bottom end flange and the nipple and defining at the interior of one end thereof threads complementary to the threads on the exterior surface of the shell halves and defining an interior shoulder at the other end thereof; and
   two O-rings, each having a radial compression set, one being sealingly disposed and radially compressed between the body of the bottom end and the interior of the nut element, the second being sealingly disposed and radially compressed between the body of the nut element and the body of the nipple.

4. A coupling as claimed in claim 3 wherein the second bottom end of the instrument is coupled to a second nipple by a union nut coupling, wherein the improvement comprises:
   said second bottom end defining a flange at the end thereof and not defining screw threads on its exterior surface; and
   two exteriorly threaded annular shell halves coupled to one another for non-rotation about said second bottom end and abutting said flange; and
   a union nut mounted about said shell halves and said nipple and arranged to engage the threads of said shell halves.

* * * * *